June 11, 1968     E. HUTZENLAUB ET AL     3,387,500
HIGH STRENGTH TRACTION MEMBER AND METHOD OF MAKING THE SAME
Filed April 28, 1966
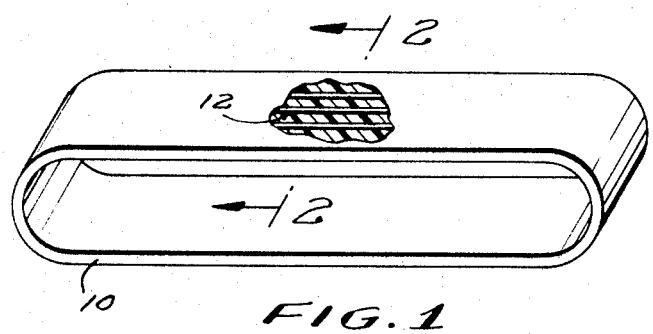
FIG. 1
FIG. 2
FIG. 3         FIG. 4
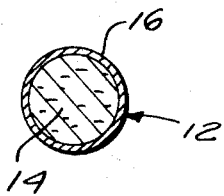 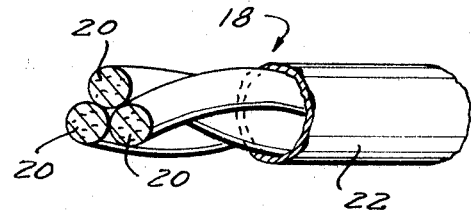
INVENTORS
ERNST HUTZENLAUB
HERMANN J. SCHLADITZ
BY
Kane, Dalsimer, Kane & Smith
ATTORNEYS United States Patent Office 3,387,500
Patented June 11, 1968

3,387,500
HIGH STRENGTH TRACTION MEMBER AND
METHOD OF MAKING THE SAME
Ernst Hutzenlaub, Gehrden, and Hermann J. Schladitz,
Munich, Germany, assignors to Schladitz-Whiskers,
AG., Zug, Switzerland, a Swiss company
Filed Apr. 28, 1966, Ser. No. 546,007
Claims priority, application Switzerland, Apr. 29, 1965,
5,924/65
5 Claims. (Cl. 74—231)

ABSTRACT OF THE DISCLOSURE

An elongated traction member of elastomeric material having, similarly, elongated and generally parallel spaced tensile reinforcing inserts, the inserts being in the form of filaments with a thin metallic surface coating.

The present invention relates to a traction member, such as a power transmission belt or rope, but particularly to an endless elastomeric belt having embedded therein reinforcing means for increasing the tensile strength of the belt over and above the strength at which such belts are rated. While the invention may be directed to many forms of traction members, for the purpose of illustration, and not intending to limit the invention, the following discussion is directed solely to the elastomeric power transmission belt.

In the past numerous attempts have been made to provide transmission belts with inserts that are embedded within the belt to increase the tensile strength thereof. These prior attempts have failed to gain widespread acceptance and have proved commercially unpractical. The prior belts were generally provided with inserts of one of two types, for example, either wires or cables of steel or filaments or fibers of synthetic materials.

While the use of steel wires or cables, as an embedded insert for belts of elastomeric material, provide advantages not obtainable by belts without such an insert, the use of such inserts results in a disadvantage rendering their use, in some environments, impossible. The metal insert properly adheres to the elastomeric material to provide additional tensile strength, but of necessity, such a reinforced belt may only be used in large installations since the permissible radius of curvature of the belt is relatively large. This is true since the radius of curvature is dependent upon the flexibility and modulus of elasticity of the insert, and steel wires or cables are relatively inflexible. Therefore, when used with equipment requiring a small radius of curvature, for example, to drive the crankshaft of an automobile, the reinforcing insert will fracture by exceeding its elastic limit.

To overcome the disadvantages which accrue with the use of steel wires or cables as an insert in an elastomeric transmission belt, the prior art moved toward the use of filaments or fibers of synthetic materials. Such materials are inherently flexible and thereby a greatly reduced radius of curvature may be obtained, thus increasing the applications to which a belt of this type may be employed.

While the belts of the type having filaments or fibers of synthetic materials embedded therein provided the aforementioned advantage, the belt was found to provide significantly less tensile strength than that obtained through the use of steel wires or cables. Tensile strength is directly related to adhesion capability—binding strength—and it is virtually impossible to obtain proper adhesion between synthetic filaments or fibers and an elastic. The cause for this poor adhesion results from the fact that the filaments or fibers, upon extrusion, become coated with a sliding film which can be removed only with great difficulty and expense. Therefore, while the belt with embedded synthetic filaments had greater application, i.e., it could be used with equipment ranging from small to large, the belt could only transmit small forces because of poor tensile strength characteristics. Thus, the prior belts failed to solve the problem here achieved.

To overcome the disadvantages and deficiencies noted above, the present invention provides an elastomeric belt having reinforcing means embedded therein that both positively adhere to the elastomeric carrier and allow the carrier to assume a radius of curvature within wide ranges. Thus, because of the good adhesion capability the tensile strength of the carrier is increased thereby being capable of transmitting greater forces. Further, by increasing the permissible range of curvature, the applications to which the belt may be adapted are also significantly increased.

The reinforcing means contemplated herein comprise fibers or filaments of either organic or inorganic materials, the surface of which is coated with a thin metal film. The reinforcing means will therefore retain the inherent flexibility of the core material yet, due to the coating, will provide a surface that uniquely and positively adheres to both the core and the elastic carrier.

The coating, as contemplated by the preferred embodiment of this invention, may be on the order of 1 micron in thickness and due to this thickness will not greatly impair the inherent flexibility of the core material. Thus, the permissible range of curvature of the elastomeric carrier is almost entirely dependent on the core material. The coating is applied to the synthetic core in a manner as will be brought out below.

Aside from overcoming the disadvantages of the prior art reinforcing inserts, the reinforcing means of the present invention also provides improved conduction and distribution of the heat of friction to substantially eliminate the possibility of the reinforcement working loose from the carrier.

Unexpectedly, the thin metal coating increases the strength of the core to produce an improved reinforcing member and allows the use of an increased number of synthetic materials which might otherwise be unsuitable for use with the elastomeric material, since it is believed that some synthetics may react chemically with the elastomer.

It is therefore an object of the present invention to provide a transmission member with reinforcement means to both increase its tensile strength and its permissible range of radius of curvature.

Other objects and advantages of the present invention will readily become apparent to one skilled in the art as the discussion is developed below.

In a broad sense the invention is directed to a traction member capable of coupling a rotary drive member to a rotary driven member and the method of making the same. The member includes a belt defined by a flexible elastomeric material and tensile reinforcing means for said belt. The reinforcing means is in the form of filaments made of a flexible material having a thin metallic coating that extends substantially longitudinal of the belt thereby to increase the tensile strength of the elastomeric material over and above the rated strength of said material.

The method comprises applying a thin metal coating to elongated filaments of material, heating the coated filament, heating a meltable flexible elastomeric material to above the melting point, and forming the molten, flexible elastomeric material into a belt with the molten material surrounding the heated coated material thereby upon cooling of the material a belt with embedded coated filaments is formed.

In the drawing which illustrates and which form a part of the present invention:

FIGURE 1 is an isometric view of a transmission belt with a surface portion broken away to illustrate the embedded coated flexible filaments;

FIGURE 2 is a view of the belt in vertical section and seen along the lines 2—2 in FIG. 1;

FIGURE 3 is a greatly enlarged view of the coated filament; and

FIGURE 4 is a view of an alternative coated filament with a portion of the coating broken away to show the core formed by braiding a plurality of filaments.

A belt 10, which in the preferred embodiment is of the endless type, having tensile reinforcing means 12 embedded therein is shown in FIG. 1. The belt is preferably formed of an elastomeric meltable material, such as either natural or synthetic rubber. One of such materials that has been successfully used is a material commercially sold in Germany by Farbenfabriken Bayer under the trademark Vulkollan. This material is an ethyleneglycol-adipic acid-polyester in combination with naphthalene-1,5-diisocyanate.

As shown in FIG. 1, the reinforcing members are oriented substantially longitudinal of the belt 10 and due to this orientation substantially increase the tensile strength of the belt. The reinforcing members 12 (FIG. 3) are defined by a filamentary core portion 14 and a metal covering 16 that is applied to the filament by known methods. One such method is by the thermal decomposition of the metal from the gas phase. Preferred metals for metal coating are nickel, iron and chromium, and by the above method, a very thin coating in the range of about 1 micron may be produced. This coating will firmly adhere during deposition on the filamentary material. The coating, further, firmly adheres the belt carrier material to form an integral body.

The filamentary core may be a synthetic resin, such as fibers of super-polyamide, polycarbonate, polyester, polyethylene, polyvinylchloride, polytetrafluorethylene, for example. The filamentary core may also be a mineral material, such as fibers of glass or asbestos, for example. All of the aforementioned materials are capable of use in the present invention and all provide good results when coated with a metallic film. Thus, the coated filaments function to increase the tensile strength of the transmission belt and permissibly adapt the belt for use in many environments wherein belts, required to transmit large forces, must also exhibit the capability of operating with either a small or a large radius of curvature.

While the flat belt 10 and reinforcing means defined by a coated single filamentary core (FIG. 3) represents the preferred combination, the invention also contemplates the use of V-belts and tooth belts provided with a coated filamentary reinforcing member, as defined above, or the reinforcing member 18 as shown in FIG. 4.

Member 18 is defined by a plurality of core filaments 20. The core may be of the same material, as brought out above, and similarly provided with a thin metallic coating 22. The coating 22 which is applied by decomposition encompasses those metals as previously discussed.

To form the reinforced belt, the metal coated filaments are suitably wound on a core of metal. Appropriate grooves are carried in the surface of the metal core. After being wound, the coated filaments are heated to a temperature of from approximately 180°–200° C.

The reinforcing means, because they are metal coated, may be heated by either high resistance or high frequency heating whereby they may easily sink into the elastic material. Thus, the coated filaments provide an added advantage.

Once the coated filaments have been heated, molten elastomeric material is poured around the metal core to thereby flow within the grooves. Due to the presence of the heated coated filaments, the flow of the molten elastomer will surround each coated filament with the latter thereby being completely embedded within the belt. Upon cooling the reinforced belt is removed from the metal core member.

From the foregoing discussion it should be apparent that the objects and advantages of the present invention are carried out. While the foregoing has been directed to a preferred embodiment of the present invention the discussion has been for the purpose of illustration only and the scope of the invention is as defined by the claims appended hereto.

Having described the invention what is claimed is:

1. A traction member for coupling a rotary drive member to a rotary driven member comprising an elongated belt made of a flexible elastomeric material, and reinforcing means for said member in the form of a core defined by elongated filaments made of a flexible material having a thin metallic coating substantially immovably embedded in said belt and extending in a direction generally longitudinal of said belt, said metallic coating having a thickness of approximately 1 micron and bonded to both the filamentary and elastomeric material whereby relative movement between the reinforcing means and the elastomeric belt material is substantially prevented and said belt has both increased tensile strength and is capable of displaying a wide range of curvature as determined by the curvature range of the flexible filamentary core material.

2. The traction of claim 1 wherein said metallic material is selected from the group consisting of nickel, chromium and iron.

3. The traction of claim 1 wherein said filaments are a synthetic resinous material selected from the group consisting of superpolyamide, polycarbonate, polyester, polyethylene, polyvinylchloride, and polytetrafluorethylene.

4. The traction of claim 1 wherein said filaments are a mineral material selected from the group consisting of glass and asbestos.

5. The traction of claim 1 wherein said elongated filaments are braided to increase their strength and said thin metallic coating is applied thereover.

References Cited
UNITED STATES PATENTS

| | | | |
|---|---|---|---|
| 1,698,035 | 1/1929 | Tobey | 74—232 |
| 1,812,354 | 6/1931 | Metcalf. | |
| 2,135,057 | 11/1938 | Slayter et al. | 74—231 |
| 2,593,284 | 4/1952 | Ewell | 74—237 XR |
| 2,633,227 | 3/1953 | Hutchins | 74—232 |
| 2,739,090 | 3/1956 | Waugh | 74—232 |
| 3,156,128 | 11/1964 | Williams | 74—232 |

MILTON KAUFMAN, *Primary Examiner.*

FRED C. MATTERN, *Examiner.*

J. A. WONG, *Assistant Examiner.*